US012684352B1

(12) United States Patent
Dharmadhikari et al.

(10) Patent No.: US 12,684,352 B1
(45) Date of Patent: Jul. 14, 2026

(54) SYSTEMS AND METHODS FOR SUPPORTING A PLURALITY OF COMMUNICATION NETWORKS

(71) Applicant: Cable Television Laboratories, Inc, Louisville, CO (US)

(72) Inventors: Omkar Dharmadhikari, Lakewood, CO (US); Sundar R. Sriram, Aurora, IL (US); Tao Wan, Ottawa (CA); Yunjung Yi, Vienna, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 539 days.

(21) Appl. No.: 18/313,264

(22) Filed: May 5, 2023

Related U.S. Application Data

(60) Provisional application No. 63/338,829, filed on May 5, 2022, provisional application No. 63/338,732, filed on May 5, 2022, provisional application No. 63/338,826, filed on May 5, 2022.

(51) Int. Cl.
| | |
|---|---|
| *G06F 21/00* | (2013.01) |
| *H04W 12/069* | (2021.01) |
| *H04W 12/08* | (2021.01) |

(52) U.S. Cl.
CPC ......... *H04W 12/069* (2021.01); *H04W 12/08* (2013.01)

(58) Field of Classification Search
CPC ............................ H04W 12/08; H04W 12/069
See application file for complete search history.

(56) References Cited

U.S. PATENT DOCUMENTS

| | | | |
|---|---|---|---|
| 10,932,132 B1 * | 2/2021 | Gundavelli | ......... H04W 12/106 |
| 2015/0358900 A1 * | 12/2015 | Duan | .................... H04W 48/16 |
| | | | 370/338 |
| 2018/0279194 A1 * | 9/2018 | Abraham | .......... H04W 36/0066 |
| 2019/0306907 A1 * | 10/2019 | Andreoli-Fang | ... H04L 41/5041 |
| 2019/0320250 A1 * | 10/2019 | Hoole | .................... H04W 48/18 |
| 2020/0280890 A1 * | 9/2020 | Vikberg | ............ H04W 36/0016 |
| 2020/0413466 A1 * | 12/2020 | Yu | .......................... H04W 76/16 |
| 2021/0344680 A1 * | 11/2021 | Guo | ...................... H04W 12/71 |
| 2023/0132554 A1 * | 5/2023 | Kravitz | ................ G06Q 10/107 |
| | | | 726/16 |
| 2023/0156457 A1 * | 5/2023 | Liu | ........................ H04W 60/04 |
| | | | 455/418 |
| 2024/0056495 A1 * | 2/2024 | Abougamia | ........ H04L 67/1008 |
| 2024/0388904 A1 * | 11/2024 | Wu | ........................ H04W 12/06 |
| 2025/0184261 A1 * | 6/2025 | Tamura | ................. H04W 48/18 |
| 2025/0234240 A1 * | 7/2025 | Salkintzis | ............. H04W 40/22 |

* cited by examiner

*Primary Examiner* — Rodman Alexander Mahmoudi
(74) *Attorney, Agent, or Firm* — PdZ Patent Law, PLLC

(57) ABSTRACT

A method operable by an authentication element for authenticating devices for a plurality of communication networks includes (1) supporting authentication of a first device for a private Third Generation Partnership Project (3GPP) wireless communication network via an interface between a core network of the private 3GPP wireless communication network and the authentication element, and (2) supporting authentication of a second device for a wireline access network, the second device being communicatively coupled to the wireline access network via a residential gateway.

26 Claims, 6 Drawing Sheets

SYSTEMS AND METHODS FOR SUPPORTING A PLURALITY OF COMMUNICATION NETWORKS

CROSS REFERENCE TO RELATED APPLICATIONS

This application claims the benefit of priority to (a) U.S. Provisional Patent Application No. 63/338,829, filed on May 5, 2022, (b) U.S. Provisional Patent Application No. 63/338, 732, filed on May 5, 2022, and (c) U.S. Provisional Patent Application No. 63/338,826, filed on May 5, 2022. Each of the aforementioned patent applications is incorporated herein by reference.

BACKGROUND

Modern cellular wireless communication networks are commonly Third Generation Partnership Project (3GPP) wireless communication networks, which are based on 3GPP technical specifications (TS). Examples of 3GPP wireless communication networks, include, but are not limited to, Long Term Evolution (LTE) wireless communication networks, and Fifth Generation (5G) wireless communication networks.

A 3GPP wireless communication network may be either a public wireless communication network, e.g., a Public Land Mobile Network (PLMN), or a private wireless communication network, e.g., a Standalone Non-Public Network (SNPN), which does not rely on network functions of a PLMN. While public and private 3GPP wireless communication networks share many features, there are significant difference between the two types of networks. For example, a PLMN requires use of a subscriber identify module (SIM) for authentication, while a SNPN supports non-SIM authentication.

DETAILED DESCRIPTION OF THE EMBODIMENTS

Figure 1:
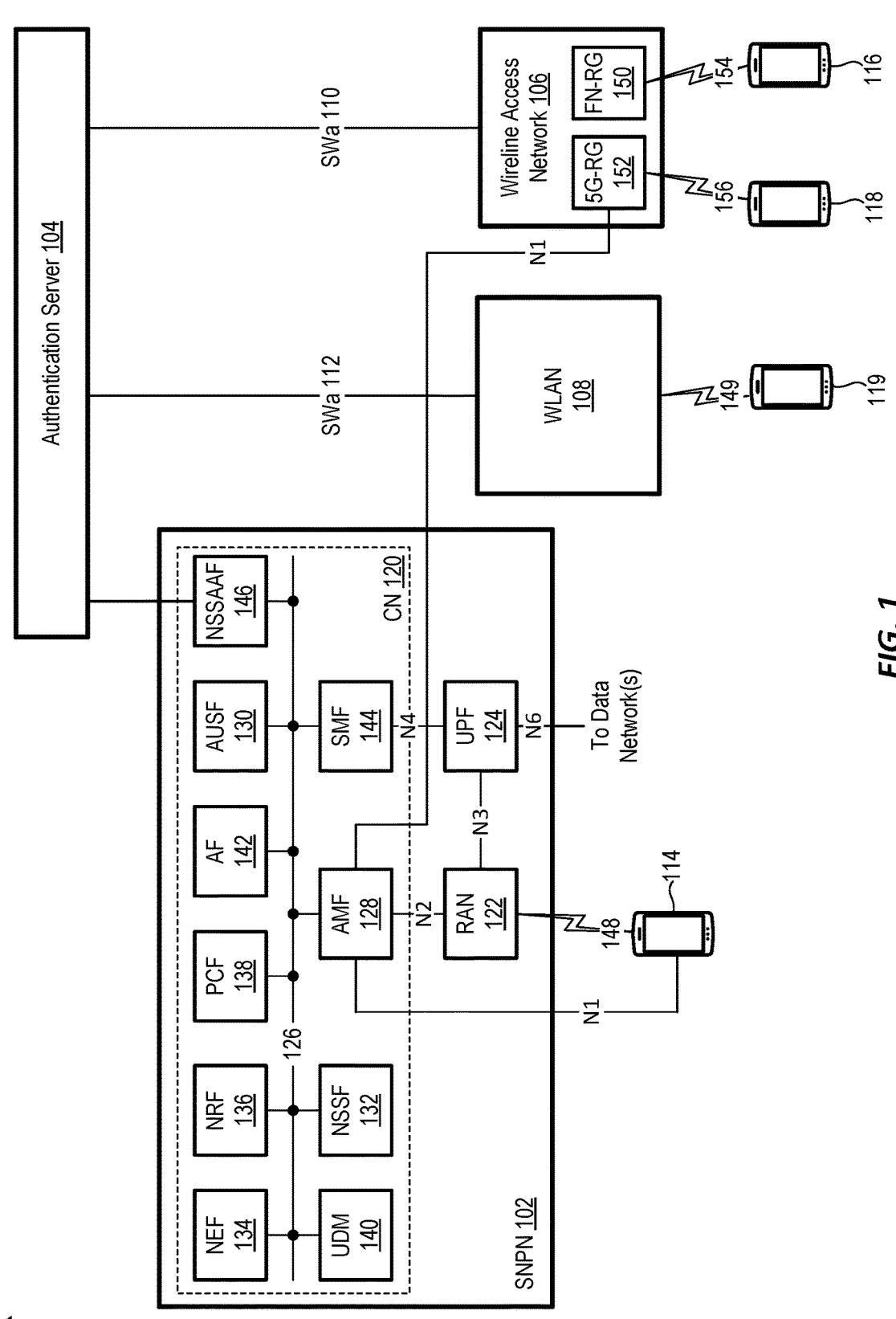
FIG. 1 is a block diagram of a communication environment including an authentication server capable of supporting authenticating of devices communicatively coupled to a wireline access network via a residential gateway, according to an embodiment.

It may be desirable to converge a Third Generation Partnership Project (3GPP) wireless communication network and one or more non-3GPP communication networks. For example, a wireline access network operator may wish to offer wireless communication service, as well as wireline communication service, to its customers, and the wireline access network operator may therefore desire to converge a 3GPP wireless communication network with its wireline access communication network. As another example, a 3GPP wireless communication network operator may wish to offload traffic from its 3GPP wireless communication network to a non-3GPP access communication network, and the network operator may therefore wish to converge a non-3GPP access communication network with its 3GPP wireless communication network.

However, conventional network technology limits convergence of a private 3GPP wireless communication network and a non-3GPP communication network. For example, while a conventional Standalone Non-Public Network (SNPN) supports shared use of an external authentication server by the SNPN and a wireless local area network (WLAN), the external authentication server cannot be used for authentication of devices communicatively coupled to the wireline access network via a residential gateway, e.g., via a Fifth Generation Residential Gateway (5G-RG) or a Fixed Network Residential Gateway (FN-RG). As another example, a conventional SNPN does not support direct access to the SNPN via a non-3GPP communication network. As an additional example, a Non-Seamless Wi-Fi Offload Function (NSWOF) of a conventional SNPN cannot support devices communicatively coupled to a wireline access network via a residential gateway, e.g., via a Fifth Generation Residential Gateway (5G-RG) or a Fixed Network Residential Gateway (FN-RG).

Disclosed herein are systems and methods for supporting a plurality of communication networks which at least partially overcome the above discussed drawbacks of conventional technology. For example, in certain embodiments, an authentication server external to a SNPN is capable of supporting authentication of devices communicatively coupled to a wireline access network via a residential gateway (e.g., a 5G-RG or a FN-RG), as well as supporting authentication of devices for the SNPN. Additionally, some embodiments support authentication of a device for a wireline access network via a SWa interface between the authentication server and the residential gateway. Furthermore, in particular embodiments, an authentication server external to a SNPN supports use of common credentials for authentication of devices, irrespective of whether the devices are connected to the SNPN or the devices are communicatively coupled to the wireline access network via a residential gateway (e.g., a 5G-RG or a RN-RG).

Furthermore, in certain embodiments, a SNPN may be directly accessed via a non-3GPP communication network, e.g., via a trusted wireless access network, a non-trusted wireless access network, and/or a wireline access network. Moreover, particular embodiments enable use of a single authentication server for supporting authentication of devices connected to a SNPN, irrespective of whether the devices are directly connected to the SNPN via a 3GPP radio access network (RAN) or a non-3GPP communication network. Additionally, some embodiments support use of common credentials for authentication of devices connected to a SNPN, irrespective of whether the devices are connected to the SNPN via a 3GPP RAN or a non-3GPP communication network.

Furthermore, particular embodiments support authenticating of a device communicatively coupled to a residential gateway (e.g., a 5G-RG or a RF-RG) of a wireline access network using a Authentication Server Function (AUSF) of a core network (CN) of a SNPN, via a Non-Seamless Wi-Fi Offload Function (NSWOF) of the CN of the SNPN. Additionally, in certain embodiments, the residential gateway is communicatively coupled to the NSWOF via a SWa interface.

Authentication of Devices Connected to a Wireline Access Network

FIG. 1 is a block diagram of a communication environment 100 including an authentication server capable of supporting authenticating of devices communicatively coupled to a wireline access network via a residential gateway. Communication environment 100 includes a SNPN 102, an authentication server 104, a wireline access network 106, a WLAN 108, a SWa interface 110, a SWa interface 112, a first device 114, a second device 116, a third device 118, and a fourth device 119. While FIG. 1 depicts communication environment 100 as including four devices, i.e., devices 114, 116, 118, and 119, the number of devices in communication environment 100 may vary. For example, communication environment 100 could include tens, hundreds, thousands, or even more, devices. Additionally, WLAN 108 (and associated SWa interface 112 and device 119) could be omitted from communication environment 100 without departing from the scope hereof. Furthermore, communication environment 100 could include additional elements, e.g., one or more additional SNPNs, authentication servers, wireline access networks, and/or WLANs, without departing from the scope hereof.

SNPN 102, which is a private 3GPP wireless communication network, such as a 5G SNPN, includes a CN 120, a 3GPP RAN 122, and a user plane function (UPF) 124. CN 120 is implemented, for example, by one or more processing systems (not shown) executing instructions in the form of software and/or firmware stored in a data storage system (not shown). In some embodiments, CN 120 is implemented in a distributed computing environment, e.g., in a cloud computing environment. CN 120 is, for example, a 5G core network (5GC). CN 120 is depicted as including the following networks functions capable of communicating with each other via a logical interface 126: an Access and Mobility Function (AMF) 128, an Authentication Server Function (AUSF) 130, a Network Slice Selection Function (NSSF) 132, a Network Exposure Function (NEF) 134, a Network Repository Function (NRF) 136, a Policy Control Function (PCF) 138, a Unified Data Management (UDM) 140, an Application Function (AF) 142, a Session Management Function (SMF) 144, and a Network Slice Specific Authentication and Authorization Function (NSSAAF) 146. However, the quantity and type of network functions of CN 120 may vary without departing from the scope hereof. AMF 128, AUSF 130, NSSF 132, NEF 134, NRF 136, PCF 138, UDM 140, AF 142, and SMF 144 are defined by 3GPP technical specifications, and details of these network functions are not discussed herein to avoid obscuring the new systems and methods for supporting a plurality of communication networks. NSSAAF 146 provides an interface between CN 120 and authentication server 104, as discussed below.

3GPP RAN 122 provides wireless access for devices to connect to CN 120. For example, FIG. 1 depicts first device 114 being communicatively coupled to 3GPP RAN 122 via an air interface 148, and 3GPP RAN 122 being communicatively coupled to AMF 128 via a 3GPP N2 logical interface. First device 114 is also communicatively coupled to AMF 128 via a 3GPP N1 logical interface. 3GPP RAN 122 includes, for example, an eNodeB, a gNodeB, and/or an extension or a successor to any of the foregoing Nodes. In some embodiments, 3GPP RAN 122 is an NG-RAN. UPF 124 is logically coupled to 3GPP RAN 122 and SMF 144 via 3GPP N3 and N4 logical interfaces, respectively. UPF 124 is also logically coupled to one or more data networks, e.g., the Internet, via a 3GPP N6 logical interface.

SNPN 102 could be replaced with another type of private 3GPP wireless communication network without departing from the scope hereof. For example, SNPN 102 could be replaced with a private 3GPP wireless communication network which is a successor or extension of a SNPN, with appropriate changes to communication environment 100.

WLAN 108 is, for example, a Wi-Fi WLAN. Fourth device 119 is communicatively coupled to WLAN 108 via an air interface 149. WLAN 108 may be trusted or untrusted, from the perspective of CN 120.

Wireline access network 106 is, for example, a cable wireline access network (e.g., operating according to a DOCSIS communication protocol), an optical wireline access network (e.g., operating according to a Ethernet passive optical network (EPON) communication protocol, a radio frequency of over glass (RFOG) communication protocol protocol, a Gigabit-capable passive optical network (GPON) communication protocol, and/or a coherent passive optical network (CPON) communication protocol), a digital subscriber line (DSL) wireline access communication network, an Ethernet wireline access network, a home networking wireline access network (e.g., operating according to a Multi-Media over Coax (MoCA) communication protocol or a HomePNA (G.hn) communication protocol), or any variations, improvements, and/or evolutions of the aforementioned wireline access networks. Wireline access network 106 includes, for example, a point-to-point network, a point-to-multipoint network, and/or a cascaded network.

Wireline access network 106 includes at least one residential gateway, where a residential gateway is a device that interfaces a local area network, e.g., at a subscriber's premises, to a wide area network (WAN) of the wireline access network. For example, wireline access network 106 is depicted as including two residential gateways, i.e., a FN-RG 150 and a 5G-RG 152, although wireline access network 106 can (and typically will) include additional residential gateways, such as a respective residential gateway for each subscriber. The residential gateways of wireline access network 106 could be heterogeneous, such as depicted in FIG. 1 with wireline access network 106 including at least one 5G-RG and at least one FN-RG, or the residential gateways of wireline access network 106 could be homogeneous (e.g., all of the residential gateways could be 5G-RG residential gateways, or all of the residential gateways could be FN-RG residential gateways). 5G-RG 152 has 3GPP 5G capabilities, such as the ability to support quality of service (QoS) and/or a 5G Non Access Stratum (NAS) stack. Accordingly, 5G-RG 152 has an active 3GPP N1 logical interface with CN 120. FN-RG 150, in contrast, does not have 3GPP capabilities, and there is accordingly no active 3GPP N1 logical interface between FN-RG 150 and CN 120.

Figure 2:
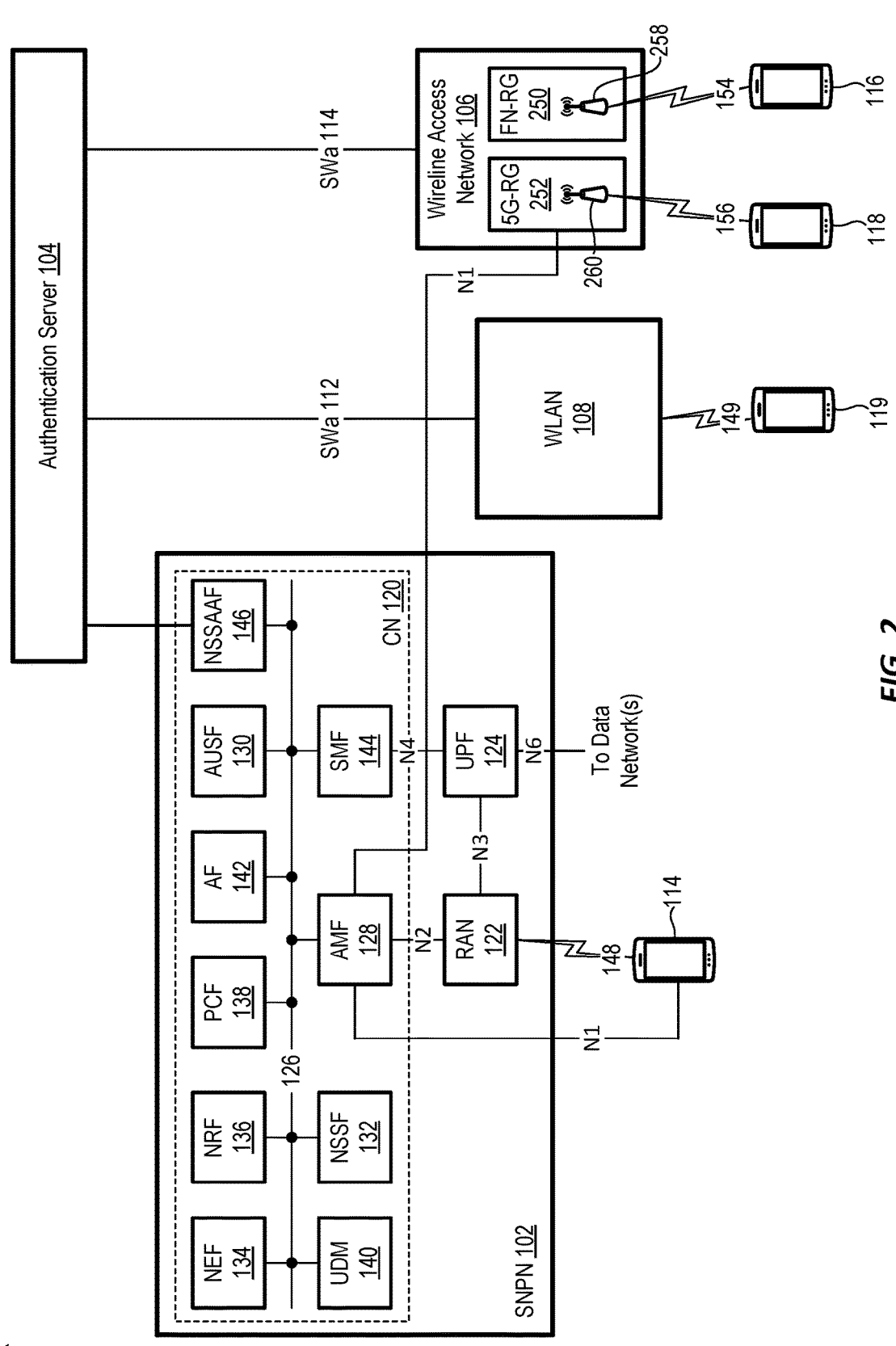
FIG. 2 is a block diagram of an embodiment of the FIG. 1 communication environment where residential gateways include integrated wireless access points.

Second device 116 is communicatively coupled to FN-RG 150 via an air interface 154, and third device 118 is communicatively coupled to 5G-RG 152 via an air interface 156. Certain embodiments of FN-RG 150 and/or 5G-RG 152 include one or more respective wireless access points integrated therein. For example, FIG. 2 is a block diagram of a communication environment 200, which is an embodiment of communication environment 100 (FIG. 1) where FN-RG 150 and 5G-RG 152 of wireline access network 106 are embodied by a FN-RG 250 and a 5G-RG 252, respectively. FN-RG 250 includes an integrated wireless access point 258, and 5G-RG includes an integrated wireless access point 260. Second device 116 is communicatively coupled to FN-RG 250 via wireless access point 258, and third device 118 is communicatively coupled to 5G-RG via wireless access point 260. In certain embodiments, wireless access point 258 and wireless access point 260 are Wi-Fi wireless access points (e.g., based on an Institute of Electrical and Electronics Engineers (IEEE) 802.11 specification), Bluetooth wireless access points, long range (LoRa) wireless access points, Z-Wave wireless access points, or Wi-Fi direct wireless access points.

Figure 3:
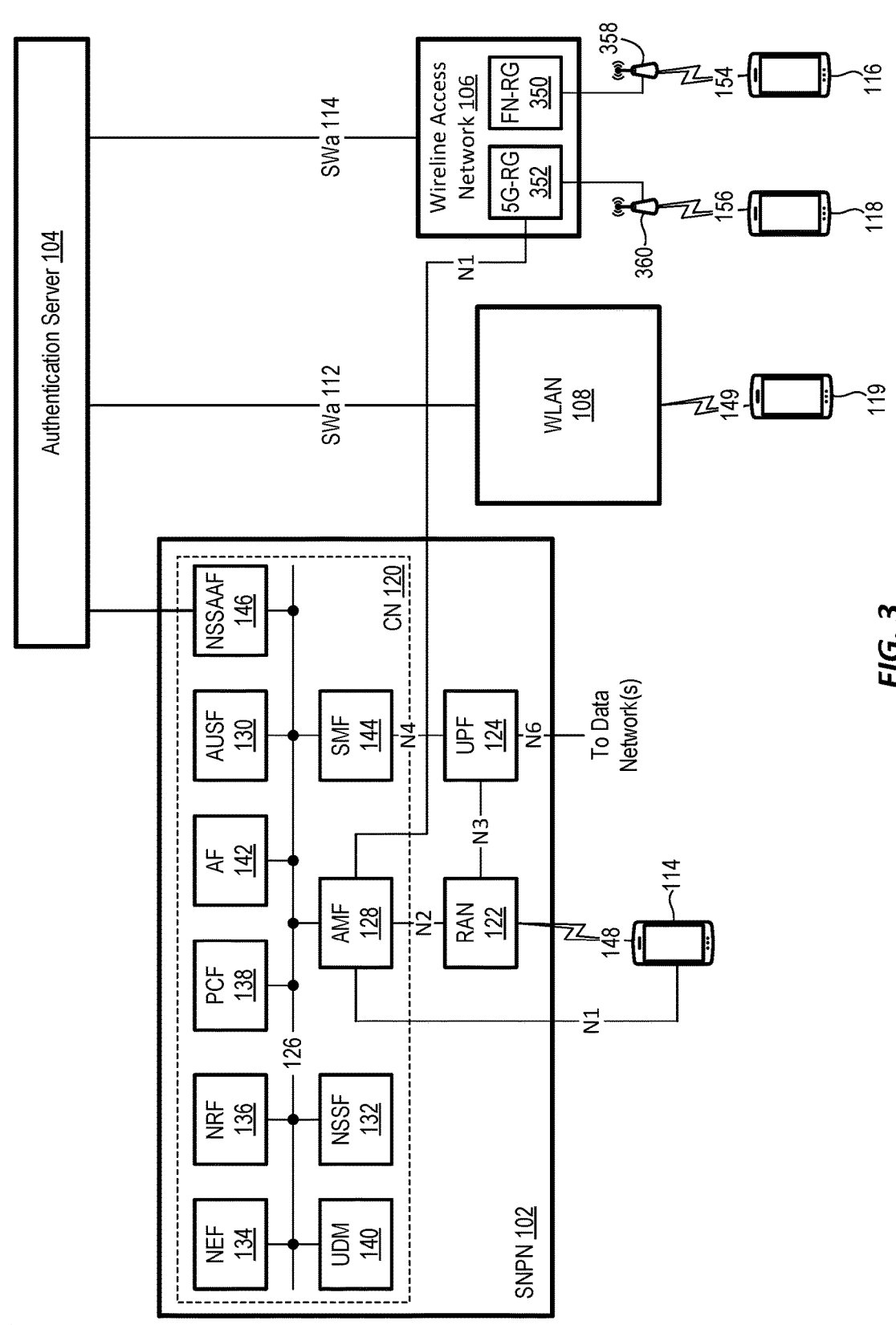
FIG. 3 is a block diagram of an embodiment of the FIG. 1 communication environment including wireless access points downstream of residential gateways.

In certain embodiments, FN-RG 150 and/or 5G-RG 152 do not include wireless access points, and one or more wireless access points are optionally communicatively coupled to FN-RG 150 and/or 5G-RG 152. For example, FIG. 3 is a block diagram of a communication environment 300, which is an embodiment of communication environment 100 (FIG. 1) where FN-RG 150 and 5G-RG 152 of wireline access network 106 are embodied by a FN-RG 350 and a 5G-RG 352, respectively. Neither FN-RG 350 nor 5G-RG 352 includes a wireless access point. However, a wireless access point 358 is communicatively to FN-RG 350 downstream of FN-RG 350, and a wireless access point 360 is communicatively coupled to 5G-RG 352 downstream of 5G-RG 352. Accordingly, second device 116 is communicatively coupled to FN-RG 350 via wireless access point 358, and third device 118 is communicatively coupled to 5G-RG 352 via wireless access point 360. In certain embodiments, wireless access point 358 and wireless access point 360 are Wi-Fi wireless access points (e.g., based on an IEEE 802.11 specification), Bluetooth wireless access points, LoRa wireless access points, Z-Wave wireless access points, or Wi-Fi direct wireless access points.

Referring again to FIG. 1, while devices 114-119 are depicted as being mobile telephones, one or more devices 114-119 could be a different type of device without departing from the scope hereof, as long as each device 114-119 is compatible with its respective communication network. For example, first device 114 must have 3GPP capability because it is connected to 3G RAN 122. Similarly, third device 118 typically also has 3GPP capability because it is connected to 5G-RG 152, although certain embodiments of 5G-RG 152 are configured to support non-3GPP (N3GPP) devices as well as 3GPP devices. However, second device 116 need not have 3GPP capability because FN-RG is not a 3GPP residential gateway. Accordingly, in particular embodiments, second device 116 is a N3GPP device. One or more devices 114-119 could alternately be, for example, a computer, a set-top device, a data storage device, an Internet of Things (IoT) device, an entertainment device, a computer networking device, a smartwatch, a wearable device with wireless capability, a medical device, a security device, a monitoring device, a wireless access device (e.g., a hot spot), or a wireless application (app) operating on an information technology device.

Figure 4:
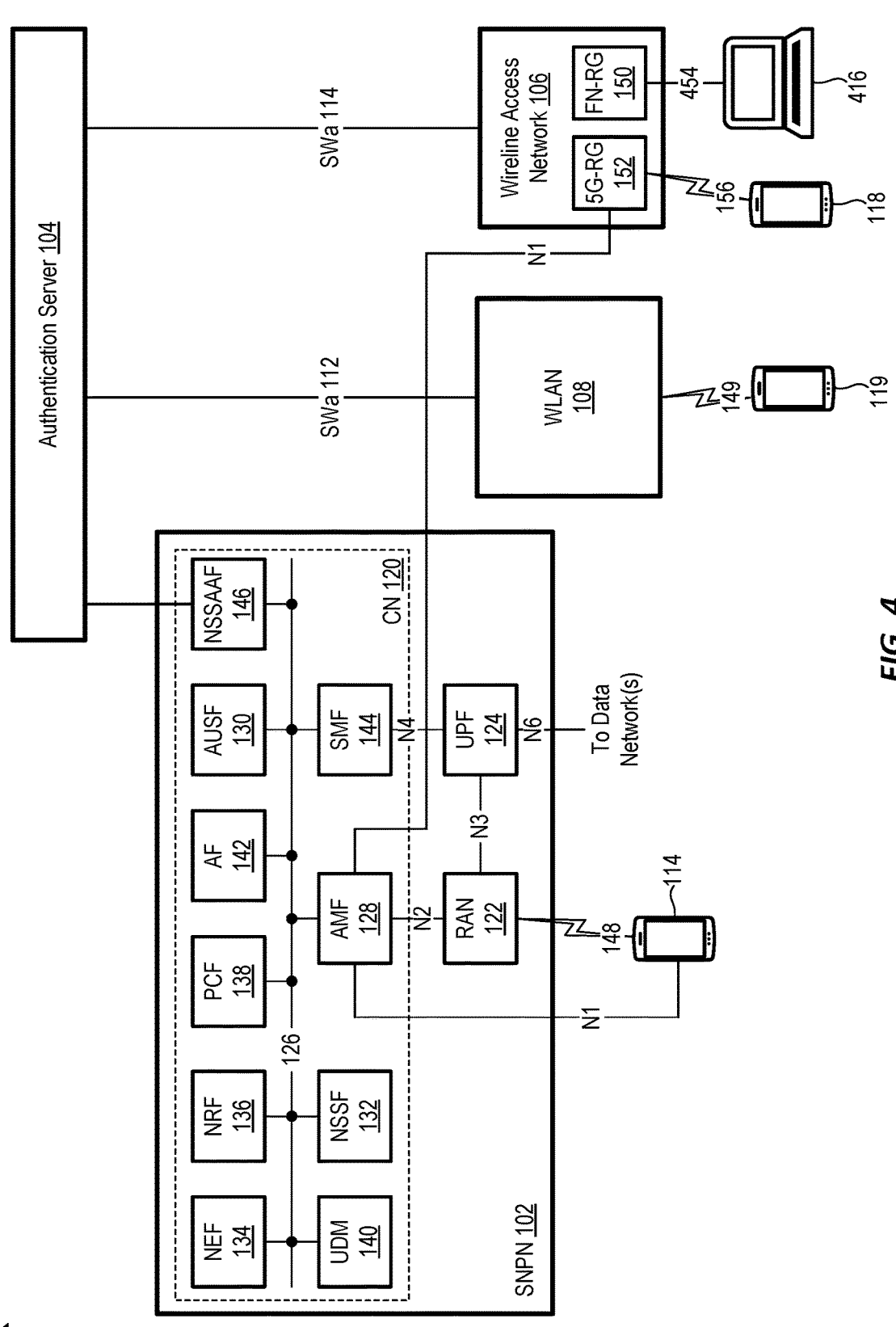
FIG. 4 is a block diagram of an alternate embodiment of the FIG. 1 communication environment where a mobile telephone is replaced with a computer.

Additionally, certain embodiments of communication environment 100 further include one or more wired devices, such as computers, televisions, gaming devices, entertainment devices, building management devices, security devices, monitoring devices, servers, etc. For example, FIG. 4 is a block diagram of a communication environment 400, which is an alternate embodiment of communication environment 100 (FIG. 1) where second device 116, which is a mobile telephone, is replaced with a device 416, which is a computer. Device 416 is communicatively coupled to FN-RG 150 via a wired interface 454 where wired interface 454 includes, for example, an electrical or optical Ethernet interface, a home networking interface (e.g., operating according to a MoCA communication protocol or a G.hn communication protocol), a Universal Serial Bus (USB) interface, a power line communication interface, etc. In some embodiments, device 416 is a N3GPP device.

Referring again to FIG. 1, authentication server 104 is separate from each of SNPN 102, WLAN 108, and wireline access network 106. In some embodiments, authentication server 104 is an authentication, authorization, and accounting (AAA) server. Additionally, authentication server 104 could be replaced with another authentication element performing the same functions as authentication server 104. Authentication server 104 is communicatively coupled to CN 120 via NSSAAF 146. Accordingly, authentication server 104 supports authentication of devices for SNPN 102, such as authentication of first device 114 for SNPN 102. In this document, supporting authentication of a device includes, for example, one or more of (a) providing, to a communication network, expected credentials of a device, such as to enable the communication network to authenticate the device, (b) comparing credentials provided by a device to expected credentials of the device, and (c) indicating whether a device has provided credentials required for authentication, such as whether credentials provided by a device match expected credentials for the device. Additionally, authentication server 104 is communicatively coupled to WLAN 108 via SWa interface 112, where a SWa interface is an interface between an authentication server and a N3GPP access network for 3GPP-based access authentication and authorization. Accordingly, authentication server 104 supports authentication of devices for WLAN 108 via SWa interface 112, such as authentication of fourth device 119 for WLAN 108.

Importantly, authentication server 104 is additionally configured to support authentication of devices communicatively to wireline access network 106 via a residential gateway, using SWa interface 110. For example, authentication server 104 is configured to support authentication of second device 116 communicatively coupled to wireline access network 106 via FN-RG 150, and authentication server 104 is configured to support authentication of third device 118 communicatively coupled to wireline access network 106 via 5G-RG 152. Accordingly, authentication server 104 is advantageously configured to support authentication of devices for multiple access communication networks. Additionally, in some embodiments, authentication server 104 supports use of common credentials for a given device irrespective of whether the device connects to 3GPP RAN 122, WLAN 108, or wireline access network 106. For example, assuming that second device 116 is a 3GPP capable device, authentication server 104 may support use of common credentials for authenticating second device 116 irrespective of whether second device 116 connects to wireline access network 106, WLAN 108, or SNPN 102.

Furthermore, particular embodiments of authentication server 104 support authentication of a given device such that the device may be simultaneously connected to two or more communication networks. For example, in some embodiments, authentication server 104 is capable of authenticating second device 116 for each of SNPN 102 and wireline access network 106, such that second device 116 is simultaneously connected to each of SNPN 102 and wireline access network 106. Moreover, some embodiments of authentication server 104 support authentication of a device for any of SNPN 102, WLAN 108, or wireline access network 106 using non-SIM based authentication, such as using a certificate-based authentication method. Examples of possible certificate-based authentication methods used by authentication server 104 include, but are not limited to, Extensible Authentication Protocol-Transport Layer (EAP-TLS) methods and Extensible Authentication Protocol-Tunneled Transport Layer (EAP-TTLS) methods.

Accordingly, communication environment 100 significantly advances convergence of a SNPN and a wireline access network including a residential gateway, relative to conventional technology.

Additional Embodiments of Communication Environment 100

Discussed below are several additional example embodiments of communication environment 100. It is understood, though, that communication environment 100 is not limited to these example embodiments.

In a particular embodiment of communication environment 100, the same credentials from authentication server 104 external to SNPN 102 can be leveraged for devices accessing SNPN 102 via (a) 3GPP RAN 122 and CN 120 and (b) a non-3GPP access network, e.g., wireline access network 106, without a connection to CN 120.

For example, many enterprise networks have existing deployments with non-3GPP network infrastructure (WLAN or wireline access networks) using a AAA server to authenticate end-devices. The addition of SNPN deployments (access via NG-RAN and 5GC) could leverage the already provisioned identities and credentials to authenticate devices accessing both a SNPN via NG-RAN and non-3GPP access networks via a credential holder (AAA server) external to the SNPN.

In certain embodiments, the same authentication server 104 that is used for authenticating device connecting to a non-3GPP network (e.g., WLAN 108 or wireline access network 106) is also used for primary authentication for devices accessing SNPN 102 via 3GPP RAN 122 and CN 120 by re-using the architecture defined for "Credentials Holder for primary authentication and authorization" as defined in clause 5.30.2.9.2 of 3GPP Technical Specification (TS) 23.501 [1].

In some embodiments, a device, e.g., user equipment (UE), uses the same permanent identity and credentials for primary authentication in SNPN 102 and the non-3GPP network (e.g., WLAN 108 or wireline access network 106). The existing identity and credentials used for WLAN 108 and wireline access network 106 authentication can be re-used for SNPN 102 using a Subscriber Permanent Identity (SUPI) in Network Access Identifier (NAI) format as defined in clause 28.7.2 of 3GPP TS 23.003 [2].

In particular embodiments, SNPN 102 and non-3GPP network (e.g., WLAN 108 or wireline access network 106) provide access to the same Data Network e.g., the Internet or an enterprise network. Additionally, some embodiments do not support seamless mobility between SNPN 102 and non-3GPP network (e.g., WLAN 108 or wireline access network 106).

In certain embodiments, the following procedure is followed:

(a) If SNPN 102 wants a device, e.g., a UE, to use the same credentials for access to a non-3GPP network (e.g., WLAN 108 or wireline access network 106) and to SNPN 102, then the device/UE is configured with the same permanent identity and credentials for primary authentication with both of SNPN 102 and the non-3GPP network (e.g., WLAN 108 or wireline access network 106).

(b) A connection is established between a 3GPP device and the non-3GPP network (e.g., WLAN 108 or wireline access network 106) that uses the external authentication server 104 for primary authentication (outside of 3GPP scope). A N3GPP device may also use authentication server 104 for primary authentication to access the non-3GPP network (e.g., WLAN 108 or wireline access network 106).

(c) A connection is established between a 3GPP capable device and SNPN 102 via 3GPPRAN 122 and CN 120 as defined in clause 5.30.2 of 3GPP TS 23.501 [1] which also uses external authentication server 104 for primary authentication re-using the architecture defined for "Credentials Holder for primary authentication and authorization" as defined in clause 5.30.2.9.2 of TS 23.501 [1].

(d) A connection is established between a 3GPP capable device and SNPN 102 via 3GPP-RAN 122 and CN 120 as defined in clause 5.30.2 of 3GPP TS 23.501 [1] which also uses same external authentication server 104 for primary authentication re-using the architecture defined for "Credentials Holder for primary authentication and authorization" as defined in clause 5.30.2.9.2 of 3GPP TS 23.501.

Non-3GPP Direct Access to a Private 3GPP Wireless Communication Network

Figure 5:
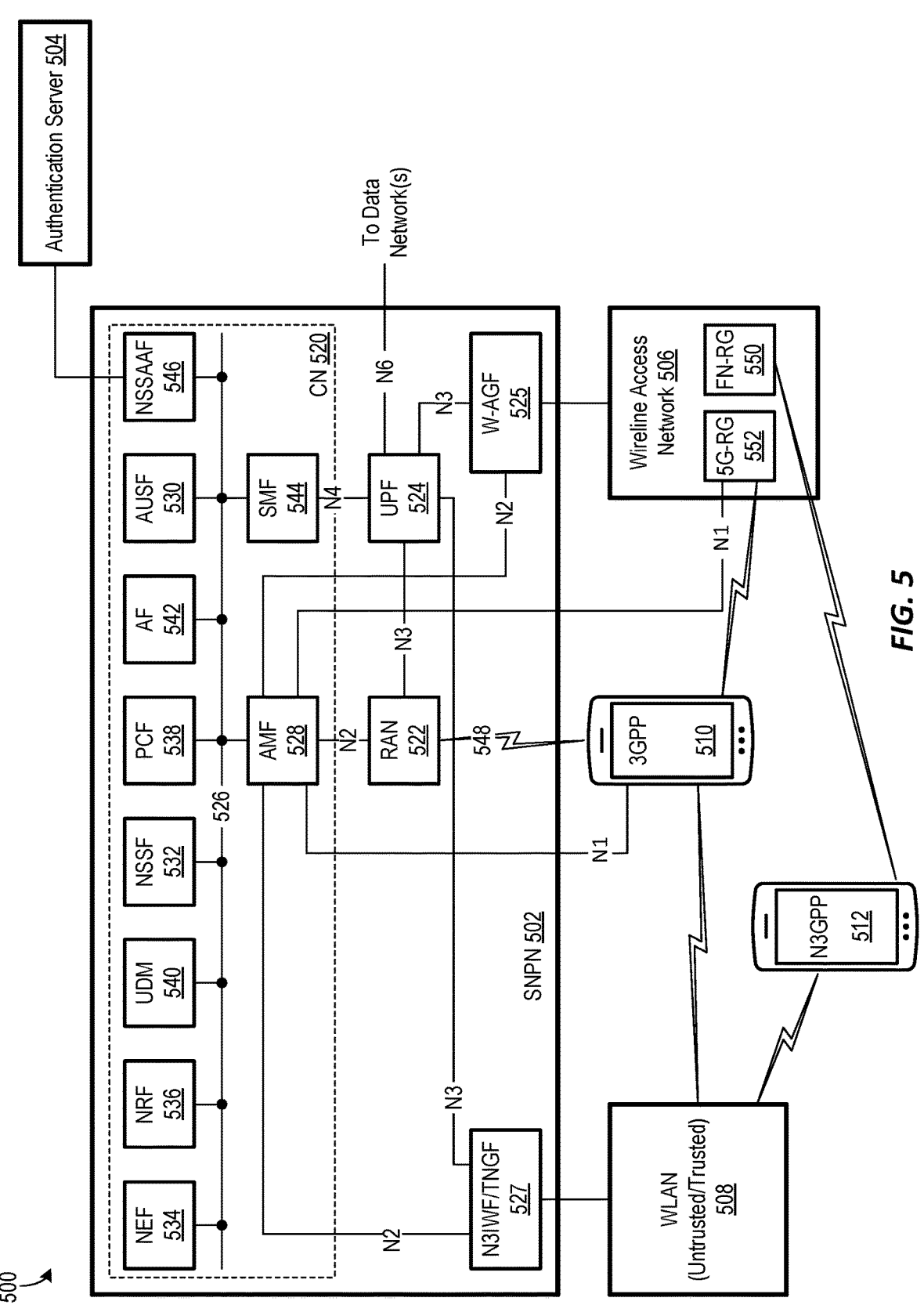
FIG. 5 is a block diagram of a communication environment including a Standalone Non-Public Network (SNPN) that may be directly accessed by a non-Third Generation Partnership Project (3GPP) communication network, according to an embodiment.

FIG. 5 is a block diagram of a communication environment 500 including a SNPN that may be directly accessed via a non-3GPP communication network. Communication environment 500 includes a SNPN 502, an authentication server 504 external to SNPN 502, a wireline access network 506, a WLAN 508, a first device 510, and a second device 512. First device 510 is a 3GPP device, and second device 512 is a non-3GPP device, and while each of first device 510 and second device 512 is depicted as being a mobile telephone, one or more of these devices could take another form. For example, one or more of first device 510 and second device 512 could alternately be a computer, a set-top device, a data storage device, an IoT device, an entertainment device, a computer networking device, a smartwatch, a wearable device with wireless capability, a medical device, a security device, a monitoring device, a wireless access device (e.g., a hot spot), or a wireless app operating on an information technology device. Additionally, communication environment 500 could include additional elements, e.g., one or more additional SNPNs, authentication servers, wireline access networks, and/or WLANs, without departing from the scope hereof.

SNPN 502, which is a private 3GPP wireless communication network, such as a 5G SNPN, includes a CN 520, a 3GPP RAN 522, a UPF 524, a Wireline Access Gateway Function (W-AGF) 525, and a Non-3GPP Interworking Function (N3IWF)/Trusted Non-3GPP Gateway Function (TNGF) 527. Element 527 is a N3IWF in embodiments where WLAN 508 is an untrusted WLAN, and Element 527 is a TNGF in embodiments where WLAN 508 is a trusted LAN. CN 520 is similar to CN 120 of communication environment 100, and CN 520 is depicted as including an AMF 528, an AUSF 530, an NSSF 532, an NEF 534, an NRF 536, a PCF 538, a UDM 540, an AF 542, a SMF 544, and a NSSAAF 546, which are capable of communicating with each other via a logical interface 526. However, the quantity and type of network functions of CN 120 may vary without departing from the scope hereof. NSSAAF 546 provides an interface between CN 520 and authentication server 504. In some embodiments, CN 520 is a 5GC.

SNPN 502 could be replaced with another type of private 3GPP wireless communication network without departing from the scope hereof. For example, SNPN 502 could be replaced with a private 3GPP wireless communication network which is a successor or extension of a SNPN, with appropriate changes to communication environment 500.

3GPP RAN 522 provides wireless access for devices to connect to CN 120. For example, FIG. 5 depicts first device 510 being communicatively coupled to 3GPP RAN 522 via an air interface 548, such as a Uu interface, and 3GPP RAN 522 being communicatively coupled to AMF 528 via a 3GPP N2 logical interface. First device 510 is also communicatively coupled to AMF 528 via a 3GPP N1 logical interface. 3GPP RAN 522 includes, for example, an eNodeB, a gNodeB, and/or an extension or a successor to any of the foregoing Nodes. In some embodiments, 3GPP RAN 522 is an NG-RAN. UPF 524 is logically coupled to 3GPP RAN 522 and SMF 544 via 3GPP N3 and N4 logical interfaces, respectively. UPF 524 is also logically coupled to one or more data networks, e.g., the Internet, via a 3GPP N6 logical interface.

Wireline access network 506 is similar to wireline access network 106 of communication environment 100, and wireline access network 506 accordingly includes at least one residential gateway. For example, wireline access network 506 is depicted as including a FN-RG 550 and a 5G-RG 552. Wireline access network 506 is communicatively coupled to SNPN 502 via network function W-AGF 525. W-AGF 525 is communicatively coupled to AMF 528 via a 3GPP N2 logical interface, and W-AGF 525 is communicatively coupled to UPF 524 via a 3GPP N3 logical interface. 5G-RG 552 has 3GPP 5G capabilities, and 5G-RG 552 accordingly has an active 3GPP N1 logical interface with CN 520. FN-RG 550, in contrast, does not have 3GPP capabilities, and there is accordingly no active 3GPP N1 logical interface between FN-RG 550 and CN 520. In some embodiments, one or more of FN-RG 550 and 5G-RG 552 include an integrated wireless access point, such as in a manner analogous to FN-RG 250 and 5G-RG 252 of communication environment 200 (FIG. 2). Additionally, in certain embodiments, a respective wireless access point is communicatively coupled to one or more of FN-RG 550 and 5G-RG 552, such as in a manner analogous to FN-RG 350 and 5G-RG 352 of communication environment 300 (FIG. 3). Furthermore, in some embodiments, one or more wired devices are communicatively coupled to one or more of FN-RG 550 and 5G-RG 552, such as in a manner analogous to how computer 416 is communicatively coupled to FN-RG 150 via wired interface 454 of communication environment 400 (FIG. 4).

WLAN 508 is similar to WLAN 108 of communication environment. WLAN 508 is either an untrusted WLAN or a trusted WLAN, from the perspective of CN 520. In some embodiments, WLAN 508 is a Wi-Fi WLAN. In embodiments where WLAN 508 is untrusted, WLAN 508 is communicatively coupled to SNPN 502 via network function N3IWF. On the other hand, in embodiments where WLAN 508 is trusted, WLAN 508 is communicatively coupled to SNPN 502 via network function TNGF 527. N3IWF/TNGF 527 is communicatively coupled to AMF 528 via a 3GPP N2 logical interface, and N3IWF/TNGF is communicatively coupled to UPF 524 via a 3GPP N3 logical interface.

Communication environment 500 supports direct access to SNPN 502 via RAN 522. Additionally, in contrast with conventional technology, communication environment 500 supports direct connection to SNPN 502 via a non-3GPP access network communicatively coupled to CN 520 via a network function of the private 3GPP wireless communication network. For example, communication environment 500 supports direct access to SNPN 502 via wireline access network 506 communicatively coupled to CN 520 via W-AGF 525. As another example, communication environment 500 supports direct access to SNPN 502 via WLAN 508 communicatively coupled to CN 520 via N3IWF/TNGF 527.

For instance, FIG. 5 illustrates first device 510 directly accessing SNPN 502 via two non-3GPP wireless communication networks, as well as via 3GPP RAN 522. In particular, first device 510 directly accesses SNPN 502 via 5G-RG 552 of wireline access network 506 and W-AGF 525. Additionally, first device 510 directly accesses SNPN 502 via WLAN 508 and N3IWF/TNGF 527. FIG. 5 also illustrates second device 512 directly accessing SNPN 502 via two non-3GPP wireless communication networks. Specifically second device 512 directly accesses SNPN 502 via FN-RG 550 of wireline access network 506 and W-AGF 525. Additionally, second device 512 directly accesses SNPN 502 via WLAN 508 and N3IWF/TNGF 527.

Additionally, in particular embodiments, authentication server 504 is advantageously capable of supporting authentication of devices accessing SNPN 502 via wireline access network 506 and/or WLAN 508, as well as devices accessing SNPN 502 via 3GG RAN 522. Furthermore, in some embodiments, authentication server 504 supports use of common credentials for a given device irrespective of whether the device connects to 3GPP RAN 522, WLAN 508, or wireline access network 506. For example, authentication server 504 may be configured to support use of common credentials for authenticating first device 510 irrespective of whether first device 510 connects to wireline access network 506, WLAN 508, or 3GPP RAN 522.

Additionally, particular embodiments of authentication server 504 support authentication of a given device such that the device may be simultaneously connected to two or more communication networks. For example, in some embodiments, authentication server 504 is capable of authenticating first device 510 for each of 3GPP RAN 522, wireless access network 506, and WLAN 508, such that third device 510 is simultaneously connected to each of these three networks. Moreover, some embodiments of authentication server 504 support authentication of a device for any of SNPN 502, WLAN 508, or wireline access network 506 using non-SIM based authentication, such as using a certificate-based authentication method. Examples of possible certificate-based authentication methods used by authentication server 504 include, but are not limited to EAP-TLS methods and EAP-TTLS methods.

Additional Embodiments of Communication Environment 500

Discussed below are several additional example embodiments of communication environment 500. It is understood, though, that communication environment 500 is not limited to these example embodiments.

In particular embodiments of communication environment 500, the same credentials from authentication server 504 external to SNPN 502 can be leveraged for devices accessing SNPN 502 via 3GPP and non-3GPP access networks (both connected to CN 520).

For example, many enterprise networks have existing deployments with non-3GPP network infrastructure (WLAN or wireline access) using a AAA server to authenticate the end-devices. The addition of SNPN deployments could leverage the already provisioned identities and credentials to authenticate devices accessing the SNPN via 3GPP and non-3GPP access networks both connecting to a 5GC via a credential holder (AAA server) external to the SNPN.

In certain embodiments, authentication server 504 re-uses the architecture defined for "Credentials Holder for primary authentication and authorization," as defined in clause 5.30.2.9.2 of 3GPP TS 23.501 [1], for primary authentication of a device accessing SNPN 502 via a 3GPP or non-3GPP access network (e.g., WLAN 508 or wireline access network 506).

In some embodiments, a device, e.g., a UE, uses the same permanent identity and credentials for primary authentication for accessing SNPN 502 via 3GPP RAN 522 and a non-3GPP network (e.g., WLAN 508 or wireline access network 506). The existing identity and credentials used for WLAN and wireline access authentication can be re-used for SNPN 502 access using a SUPI in NAI format as defined in clause 28.7.2 of 3GPP TS 23.003 [2].

SNPN 502 access via 3GPP RAN 522 and the non-3GPP network (e.g., WLAN 508 or wireline access network 506) provides access to the same Data Network e.g., the Internet or an enterprise network.

Additionally, particular embodiments of communication environment 500 support seamless mobility between 3GPP RAN 522 and the non-3GPP network (e.g., WLAN 508 or wireline access network 506) for accessing SNPN 502.

In certain embodiments, the following procedure is followed:

(a) If SNPN 502 wants a device/UE to use the same credentials for accessing SNPN 502 via a 3GPP or a non-3GPP access network, the UE/device is configured with the same permanent identity and credentials for primary authentication with 3GPP RAN 522 and the non-3GPP access network (e.g., WLAN 508 or wireline access network 506).

(b) A connection is established between a 3GPP device, e.g., first device 510, towards CN 520 via the untrusted non-3GPP access using the procedures as defined in clause 4.12 of 3GPP TS 23.502 [4] or a connection is established between a 3GPP capable device towards CN 520 via the trusted non-3GPP access using the procedures as defined in clause 4.12a of 2GPP TS 23.502 [4], or a connection is established between a 3GPP capable device towards CN 520 via the wireline access using the procedures as defined in clause 7 of 3GPP TS 23.316 [5].

(c) A connection is established between N3GPP devices, e.g., second device 512, towards CN 520 via the wireline access using the procedures as defined in clause 7 of 3GPP TS 23.316 [5].

(d) A connection is established between a 3GPP device, e.g., first device 510, and SNPN 502 via 3GPP RAN 522 and CN 520 as defined in clause 5.30.2 of TS 23.501 [1].

In particular embodiments, the same credentials are used for authentication by an external credential holder (authentication server 504) for primary authentication of a device accessing SNPN 502 via 3GPP or the non-3GPP access network (e.g., WLAN 508 or wireline access network 506), such as by re-using the architecture defined for "Credentials Holder for primary authentication and authorization" as defined in clause 5.30.2.9.2 of TS 23.501 [1].

In certain embodiments, a device may establish a connection towards CN 520 using either or both of 3GPP RAN 522 and a non-3GPP access network (e.g., WLAN 508 or wireline access network 506), and a device may establish a connection towards CN 520 simultaneously using each of 3GPP RAN 522 and a non-3GPP access network (e.g., WLAN 508 or wireline access network 506).

Wireline Access Network Support for a NSWOF

Figure 6:
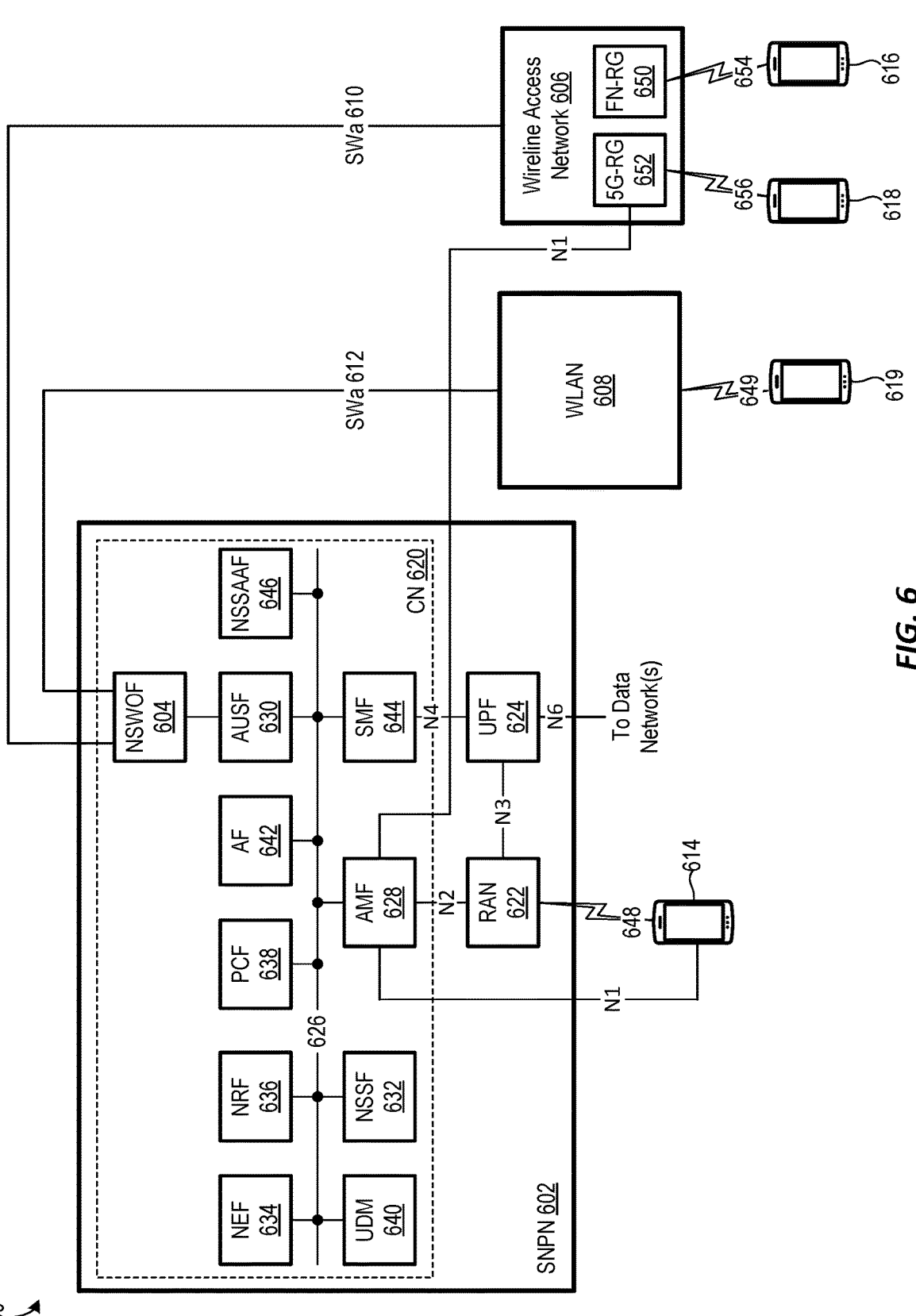
FIG. 6 is a block diagram of a communication environment including wireline access network support for a Non-Seamless Wi-Fi Offload Function (NSWOF), according to an embodiment.

FIG. 6 is a block diagram of a communication environment 600 including wireline access network support for a NSWOF. Communication environment 600 includes a SNPN 602, a wireline access network 606, a WLAN 608, a SWa interface 610, a SWa interface 612, a first device 614, a second device 616, a third device 618, and a fourth device 619. Communication environment 600 could include a different number of devices without departing from the scope hereof. While each of devices 614-619 is depicted as being a mobile telephone, one or more of these devices could take another form. For example, one or more of devices 614-619 could alternately be a computer, a set-top device, a data storage device, an IoT device, an entertainment device, a computer networking device, a smartwatch, a wearable device with wireless capability, a medical device, a security device, a monitoring device, a wireless access device (e.g., a hot spot), or a wireless app on an information technology device. Additionally, communication environment 600 could include additional elements, e.g., one or more additional SNPNs, authentication servers, wireline access networks, and/or WLANs, without departing from the scope hereof.

SNPN 602 includes a CN 620, a 3GPP RAN 622, and a UPF 624. CN 620 is similar to CN 120 of communication environment 100. For example, CN 620 includes an AMF 628, an AUSF 630, an NSSF 632, an NEF 634, an NRF 636, a PCF 638, a UDM 640, an AF 642, a SMF 644, and a NSSAAF 646, which are capable of communicating with each other via a logical interface 626. However, CN 620 further includes a NSWOF 604 communicatively coupled to AUSF 630. As discussed below, NSWOF 604 enables CN 620 to support authentication of devices for wireline access network 606, such as for WLAN 608 and 3G RAN 622, as well as for WLAN 608. In some embodiments, CN 620 is a 5GC. The quantity and type of network functions of CN 620 may vary without departing from the scope hereof.

3GPP RAN 622 provides wireless access for devices to connect to CN 620. For example, FIG. 6 depicts first device 614 being communicatively coupled to 3GPP RAN 622 via an air interface 648, and 3GPP RAN 622 being communicatively coupled to AMF 628 via a 3GPP N2 logical interface. First device 614 is also communicatively coupled to AMF 628 via a 3GPP N1 logical interface. 3GPP RAN 622 includes, for example, an eNodeB, a gNodeB, and/or an extension or a successor to any of the foregoing Nodes. In some embodiments, 3GPP RAN 622 is an NG-RAN. UPF 624 is logically coupled to 3GPP RAN 622 and SMF 644 via 3GPP N3 and N4 logical interfaces, respectively. UPF 624 is also logically coupled to one or more data networks, e.g., the Internet, via a 3GPP N6 logical interface.

SNPN 602 could be replaced with another type of private 3GPP wireless communication network without departing from the scope hereof. For example, SNPN 602 could be replaced with a private 3GPP wireless communication network which is a successor or extension of a SNPN, with appropriate changes to communication environment 600.

WLAN 608 is similar to WLAN 108 of communication environment 100. WLAN 608 is, for example, a Wi-Fi WLAN. Fourth device 619 is communicatively coupled to WLAN 608 via an air interface 649. WLAN 608 may be trusted or untrusted, from the perspective of CN 620.

Wireline access network 606 is similar to wireline access network 106 of communication environment 100, and wireline access network 606 accordingly includes at least one residential gateway. For example, wireline access network 606 is depicted as including a FN-RG 650 and a 5G-RG 652. 5G-RG 652 has 3GPP capabilities, and 5G-RG 652 accordingly has an active 3GPP N1 logical interface with CN 620. FN-RG 650, in contrast, does not have 3GPP capabilities, and there is accordingly no active 3GPP N1 logical interface between FN-RG 650 and CN 620. In some embodiments, one or more of FN-RG 650 and 5G-RG 652 includes an integrated wireless access point, such as in a manner analogous to FN-RG 250 and 5G-RG 252 of communication environment 200 (FIG. 2). Additionally, in certain embodiments, a respective wireless access point is communicatively coupled to one or more of FN-RG 650 and 5G-RG 652, such as in a manner analogous to that of FN-RG 350 and 5G-RG 352 of communication environment 300 (FIG. 3). Furthermore, in some embodiments, one or more wired devices are communicatively coupled to one or more of FN-RG 650 and 5G-RG 652, such as in a manner analogous to how computer 416 is communicatively coupled to FN-RG 150 via wired interface 454 of communication environment 400 (FIG. 4).

NSWOF 604 is communicatively coupled to residential gateways (e.g., FN-RG 650 and 5G-RG 652) of wireline access network 606 via SWa interface 610. Additionally, NSWOF 604 is communicatively coupled to WLAN 608 via SWa interface 612.

Importantly, AUSF 630 is configured to authenticate devices communicatively coupled to wireline access network 606 via a residential gateway, as well as devices connected to 3GPP RAN 622 and WLAN 608. For example, AUSF 630 is configured to authenticate second device 616 communicatively coupled to wireline access network 606 via FN-RG 650 using NSWOF 604 and SWa 610. As another example, AUSF 630 is configured to authenticate third device 618 communicatively coupled to wireline access network 606 via 5G-RG 650 using NSWOF 604 and SWa 610. AUSF 630 is also configured to authenticate fourth device 619 communicatively coupled to WLAN 608 using NSWOF 604 and SWa 612.

In certain embodiments, AUSF 630 is configured to support use of common credentials for a given device irrespective of whether the device connects to 3GPP RAN 622, WLAN 608, or wireline access network 606. For example, assuming that second device 616 is a 3GPP capable device, AUSF 630 may support use of common credentials for authenticating second device 616 irrespective of whether second device 116 connects to wireline access network 606, WLAN 608, or SNPN 602. Additionally, particular embodiments of AUSF 630 support authentication of a given device such that the device may be simultaneously connected to two or more communication networks. For example, in some embodiments, AUSF 630 is capable of authenticating second device 616 for each of SNPN 602 and wireline access network 606, such that second device 616 is simultaneously connected to each of SNPN 602 and wireline access network 606.

In certain embodiments, AUSF 630 is solely capable of authenticating 3GPP devices, and in these embodiments, each of devices 614-619 is accordingly a 3GPP device. However, in some other embodiments, AUSF 630 is capable of authenticating non-3GPP devices as well as 3GPP devices, and in these embodiments, one or more devices 614-619 is optionally a N3GPP device.

Additional Embodiments of Communication Environment 600

Discussed below are several additional example embodiments of communication environment 600. It is understood, though, that communication environment 600 is not limited to these example embodiments.

In particular embodiments of communication environment 600, the same credentials can be leveraged for (a) devices accessing SNPN 602 via 3GPP RAN 622 and CN 620, and (b) non-3GPP network access using NSWOF 604. In case a device is connected via WLAN 608 for the non-3GPP access network, NSWOF 604 interfaces to WLAN 608 using SWa interface 612, as defined in 3GPP TS 23.402 [1], and interfaces to AUSF 630 using the Nausf Service Based Interface (SBI) performing protocol translation and AUSF discovery.

In certain embodiments, if a device is connected via a residential gateway (e.g., FN-RG 650 or 5G-RG 652), NSWOF support for wireline access that is being addressed in 3GPP Rel-18 5WWC (e.g., Solution #22 in TR 23.700-17 [2]) is assumed. For example, NSWOF 604 may interface to 5G-RG 652 using SWa interface 610, using a procedure referred in [2]. Based on this solution, the device connecting to 5G-RG 652 is authenticated and authorized by the Home Public Land Mobile Network (HPLMN) of this device. The authentication procedure does not require 5GS registration because it is based on the NSWOF authentication procedure specified in Annex S of 3GPP TS 33.501 [9].

In some embodiments, an architecture to support authentication via NSWOF 604 is as defined in clause 4.2.15 of 3GPP TS 23.501 [3].

In particular embodiments, procedures for AUSF 630 discovery and selection by NSWOF 604 are as defined in clause 6.3.4 of 3GPP TS 23.501 [3].

In some embodiments, functionality of NSWOF 604 and the procedures applied for supporting WLAN connection or wireline connection using 5GS credentials for Non-seamless WLAN offload are as defined in 3GPP TS 33.501 [4] (e.g., in Annex S).

In certain embodiments, when a device/UE wishes to use NSWOF 604 to connect to a non-3GPP network (e.g., WLAN 608 or wireline access network 606) using its 5GS credentials associated with SNPN 602, the NAI format for NSWOF 604 access used is as defined in clause 28.7.6 and 28.7.7 of 3GPP TS 23.003 [5].

In particular embodiments, SNPN 602 and the non-3GPP network (e.g., WLAN 608 or wireline access network 606) provides access to the same Data Network e.g., the Internet or an enterprise network.

Some embodiments do not support mobility between SNPN 602 and a non-3GPP network (e.g., WLAN 608 or wireline access network 606).

In certain embodiments, the following procedure is followed:

(a) A device/UE can use the same permanent identity and credentials that are used for primary authentication with SNPN 602 to connect to a non-3GPP network (e.g., WLAN 608 or wireline access network 606) using NSWOF 604 interacting with AUSF 630 to authenticate the device/UE.

(b) A connection is established between a 3GPP capable device and SNPN 602 via 3GPP RAN 622 and CN 620 as defined in clause 5.30.2 of 3GPP TS 23.501 [1].

(c) A connection is established between a 3GPP device and a non-3GPP network (e.g., WLAN 608 or wireline access network 606) that uses the same permanent identity and credentials that are used for primary authentication with SNPN 602 using NSWOF 604 as defined in 3GPP TS 33.501 Annex S.

(d) A N3GPP device may also use the same permanent identity and credentials for authentication via NSWOF 604 to access WLAN 608 or wireline access network 606.

In certain embodiments, a 3GPP capable device may establish connection towards either or both of the non-3GPP network (e.g., WLAN 608 or wireline access network 606) and SNPN 602 via 3GPP RAN 622 and CN 620, and a 3GPP capable device may simultaneously establish connection towards each of the non-3GPP network (e.g., WLAN 608 or wireline access network 606) and SNPN 602 via 3GPP RAN 622 and CN 620.

Combinations of Features

Features described above may be combined in various ways without departing from the scope hereof. The following examples illustrate some possible combinations.

(A1) A method operable by an authentication element for authenticating devices for a plurality of communication networks includes (1) supporting authentication of a first device for a private Third Generation Partnership Project (3GPP) wireless communication network via an interface between a core network of the private 3GPP wireless communication network and the authentication element and (2) supporting authentication of a second device for a wireline access network, the second device being communicatively coupled to the wireline access network via a residential gateway.

(A2) In the method denoted as (A1), the residential gateway may be selected from the group consisting of a Fifth Generation Residential Gateway (5G-RG) and a Fixed Network Residential Gateway (FN-RG).

(A3) In either one of the methods denoted as (A1) or (A2), the second device may be communicatively coupled to the residential gateway via a wireless access point.

(A4) In any one of the methods denoted as (A1) through (A3), the method may further include supporting authentication of the second device for the wireline access network via a SWa interface between the authentication element and the residential gateway.

(A5) In any one of the methods denoted as (A1) through (A4), the private 3GPP wireless communication network may be a Standalone Non-Public Network (SNPN).

(A6) In the method denoted as (A5), the SNPN may be a Fifth Generation (5G) SNPN.

(A7) In any one of the methods denoted as (A1) through (A6), the interface between the core network of the private 3GPP wireless communication network and the authentication element may include a Network Slice Specific Authentication and Authorization Function (NSSAAF).

(A8) In any one of the methods denoted as (A1) through (A7), the authentication element may be separate from each of the private 3GPP wireless communication network and the wireline access network.

(A9) In any one of the methods denoted as (A1) through (A8), the method may further include using common credentials to support each of (a) authentication of the first device for the private 3GPP wireless communication network and (b) authentication of the second device for the wireline access network.

(A10) In any one of the methods denoted as (A1) through (A9), the method may further include supporting authentication of each of the first device and the second device using a certificate-based authentication method.

(A11) In any one of the methods denoted as (A1) through (A10), the method may further include (a) supporting authentication of a third device for the private 3GPP wireless communication network via the interface between the core network of the private 3GPP wireless communication network and the authentication element and (b) supporting authentication of the third device for the wireline access network, the third device being communicatively coupled to the wireline access network via the residential gateway.

(A12) In any one of the methods denoted as (A1) through (A10), the method may further include using common credentials to support each of (a) authentication of the third device for the private 3GPP wireless communication network and (b) authentication of the third device for the wireline access network.

(A13) In any one of the methods denoted as (A1) through (A10), the method may further include authenticating a third device for a wireless local area network (WLAN) via a SWa interface between the authentication element and the WLAN.

(A14) In any one of the methods denoted as (A1) through (A13), the second device may be a Non-3GPP (N3GPP) device.

(B1) A method operable by a private Third Generation Partnership Project (3GPP) wireless communication network to support direct access via a plurality of access networks includes (1) supporting direct access to the private 3GPP wireless communication network via a 3GPP radio access network (RAN) communicatively coupled to a core network (CN) of the private 3GPP wireless communication network and (2) supporting direct access to the private 3GPP wireless communication network via a non-3GPP access network communicatively coupled to the CN of the private 3GPP wireless communication network via a network function of the private 3GPP wireless communication network.

(B2) In the method denoted as (B1), the network function of the private 3GPP wireless communication network may be selected from the group consisting of a Trusted Non-3GPP Gateway Function (TNGF), a Non-3GPP Interworking Function (N3IWF), and a Wireline Access Gateway Function (W-AGF).

(B3) In either one of the methods denoted as (B1) and (B2), the non-3GPP access network is selected from the group consisting of a trusted wireless local area network, a non-trusted wireless local area network, and a wireline access network.

(B4) In any one of the methods denoted as (B1) through (B3), the method may further include supporting authentication of each of (a) a first device accessing the private 3GPP wireless communication network via the 3GPP RAN and (b) a second device accessing the private 3GPP wireless communication network via the non-3GPP access network, using a common authentication element external to the private 3GPP wireless communication network.

(B5) In any one of the methods denoted as (B1) through (B4), the method may further include supporting authentication of each of (a) a first device accessing the private 3GPP wireless communication network via the 3GPP RAN and (b) the first device accessing the private 3GPP wireless communication network via the non-3GPP access network, using common credentials.

(B6) In any one of the methods denoted as (B1) through (B5), the private 3GPP wireless communication network may be a Standalone Non-Public Network (SNPN).

(B7) In the method denoted as (B6), the SNPN may be a Fifth Generation (5G) SNPN.

(C1) A method operable by a private Third Generation Partnership Project (3GPP) wireless communication network for authenticating devices for a plurality of access networks includes (1) authenticating a first device communicatively coupled to the private 3GPP wireless communication network via a 3GPP radio access network (RAN) at least partially using an Authentication Server Function (AUSF) of a core network (CN) of the private 3GPP wireless communication network and (2) authenticating a second device communicatively coupled to a residential gateway of a wireline access network using the AUSF of the CN of the private 3GPP wireless communication network, via a Non-Seamless Wi-Fi Offload Function (NSWOF) of the CN of the private 3GPP wireless communication network.

(C2) In the method denoted as (C1), the residential gateway may be selected from the group consisting of a Fifth Generation Residential Gateway (5G-RG) and a Fixed Network Residential Gateway (FN-RG).

(C3) In either one of the methods denoted as (C1) and (C2), the residential gateway may be communicatively coupled to the NSWOF via a SWa interface.

(C4) In any one of the methods denoted as (C1) through (C3), the second device may be communicatively coupled to the residential gateway via a wireless access point.

(C5) In any one of the methods denoted as (C1) through (C4), the private 3GPP wireless communication network may be a Standalone Non-Public Network (SNPN).

(C6) In the method denoted as (C5), the SNPN may be a Fifth Generation (5G) SNPN.

(C7) In any one of the methods denoted as (C1) through (C6), the method may further include using a common set of credentials to authenticate a third device irrespective of whether the third device connects to the private 3GPP wireless communication network via the 3GPP RAN or the third device connects to the residential gateway of the wireline access network.

(C8) In any one of the methods denoted as (C1) through (C6), the method may further include authenticating a third device communicatively coupled to a wireless local area network (WLAN) using the AUSF of the CN of the private 3GPP wireless communication network, via the NSWOF of the CN of the private 3GPP wireless communication network.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method operable by an authentication element for authenticating devices for a plurality of communication networks, the method comprising:
    supporting authentication of a first device for a private Third Generation Partnership Project (3GPP) wireless communication network via an interface between a core network of the private 3GPP wireless communication network and the authentication element;
    supporting authentication of a second device for a wireline access network, the second device being communicatively coupled to the wireline access network via a residential gateway;
    supporting authentication of a third device for the private 3GPP wireless communication network via the interface between the core network of the private 3GPP wireless communication network and the authentication element; and
    supporting authentication of the third device for the wireline access network, the third device being communicatively coupled to the wireline access network via the residential gateway.

2. The method of claim 1, wherein the residential gateway is selected from a group consisting of a Fifth Generation Residential Gateway (5G-RG) and a Fixed Network Residential Gateway (FN-RG).

3. The method of claim 1, wherein the second device is communicatively coupled to the residential gateway via a wireless access point.

4. The method of claim 1, further comprising supporting authentication of the second device for the wireline access network via a SWa interface between the authentication element and the residential gateway.

5. The method of claim 1, wherein the private 3GPP wireless communication network is a Standalone Non-Public Network (SNPN).

6. The method of claim 5, wherein the SNPN is a Fifth Generation (5G) SNPN.

7. The method of claim 1, wherein the interface between the core network of the private 3GPP wireless communication network and the authentication element comprises a Network Slice Specific Authentication and Authorization Function (NSSAAF).

8. The method of claim 1, wherein the authentication element is separate from each of the private 3GPP wireless communication network and the wireline access network.

9. The method of claim 1, further comprising using common credentials to support each of (a) authentication of the first device for the private 3GPP wireless communication network and (b) authentication of the second device for the wireline access network.

10. The method of claim 1, further comprising supporting authentication of each of the first device and the second device using a certificate-based authentication method.

11. The method of claim 1, further comprising using common credentials to support each of (a) authentication of the third device for the private 3GPP wireless communication network and (b) authentication of the third device for the wireline access network.

12. The method of claim 1, further comprising authenticating a fourth device for a wireless local area network (WLAN) via a SWa interface between the authentication element and the WLAN.

13. The method of claim 1, wherein the second device is a Non-3GPP (N3GPP) device.

14. A method operable by a private Third Generation Partnership Project (3GPP) wireless communication network to support direct access via a plurality of access networks, the method comprising:

supporting direct access to the private 3GPP wireless communication network via a 3GPP radio access network (RAN) communicatively coupled to a core network (CN) of the private 3GPP wireless communication network;

supporting direct access to the private 3GPP wireless communication network via a non-3GPP access network communicatively coupled to the CN of the private 3GPP wireless communication network via a network function of the private 3GPP wireless communication network; and supporting authentication of each of (a) a first device accessing the private 3GPP wireless communication network via the 3GPP RAN and (b) a second device accessing the private 3GPP wireless communication network via the non-3GPP access network, using a common authentication element external to the private 3GPP wireless communication network.

15. The method of claim 14, wherein the network function of the private 3GPP wireless communication network is selected from a group consisting of a Trusted Non-3GPP Gateway Function (TNGF), a Non-3GPP Interworking Function (N3IWF), and a Wireline Access Gateway Function (W-AGF).

16. The method of claim 14, wherein the non-3GPP access network is selected from a group consisting of a trusted wireless local area network, a non-trusted wireless local area network, and a wireline access network.

17. The method of claim 14, further comprising supporting authentication of each of (a) the first device accessing the private 3GPP wireless communication network via the 3GPP RAN and (b) the first device accessing the private 3GPP wireless communication network via the non-3GPP access network, using common credentials.

18. The method of claim 14, wherein the private 3GPP wireless communication network is a Standalone Non-Public Network (SNPN).

19. The method of claim 18, wherein the SNPN is a Fifth Generation (5G) SNPN.

20. A method operable by a private Third Generation Partnership Project (3GPP) wireless communication network for authenticating devices for a plurality of access networks, the method comprising:

authenticating a first device communicatively coupled to the private 3GPP wireless communication network via a 3GPP radio access network (RAN) at least partially using an Authentication Server Function (AUSF) of a core network (CN) of the private 3GPP wireless communication network;

authenticating a second device communicatively coupled to a residential gateway of a wireline access network using the AUSF of the CN of the private 3GPP wireless communication network, via a Non-Seamless Wi-Fi Offload Function (NSWOF) of the CN of the private 3GPP wireless communication network; and using a common set of credentials to authenticate a third device irrespective of whether the third device connects to the private 3GPP wireless communication network via the 3GPP RAN or the third device connects to the residential gateway of the wireline access network.

21. The method of claim 20, wherein the residential gateway is selected from the group consisting of a Fifth Generation Residential Gateway (5G-RG) and a Fixed Network Residential Gateway (FN-RG).

22. The method of claim 20, wherein the residential gateway is communicatively coupled to the NSWOF via a SWa interface.

23. The method of claim 20, wherein the second device is communicatively coupled to the residential gateway via a wireless access point.

24. The method of claim 20, wherein the private 3GPP wireless communication network is a Standalone Non-Public Network (SNPN).

25. The method of claim 24, wherein the SNPN is a Fifth Generation (5G) SNPN.

26. A method operable by a private Third Generation Partnership Project (3GPP) wireless communication network for authenticating devices for a plurality of access networks, the method comprising:

authenticating a first device communicatively coupled to the private 3GPP wireless communication network via a 3GPP radio access network (RAN) at least partially using an Authentication Server Function (AUSF) of a core network (CN) of the private 3GPP wireless communication network;

authenticating a second device communicatively coupled to a residential gateway of a wireline access network using the AUSF of the CN of the private 3GPP wireless communication network, via a Non-Seamless Wi-Fi Offload Function (NSWOF) of the CN of the private 3GPP wireless communication network; and authenticating a third device communicatively coupled to a wireless local area network (WLAN) using the AUSF of the CN of the private 3GPP wireless communication network, via the NSWOF of the CN of the private 3GPP wireless communication network.

* * * * *